(12) United States Patent
Rupp et al.

(10) Patent No.: US 6,175,171 B1
(45) Date of Patent: Jan. 16, 2001

(54) ELECTRIC DRIVE MOTOR

(75) Inventors: Bernhard Rupp, Sulzfeld; Gerd Knoepfel, Buehl; Bruno Hoess, Ottersweier, all of (DE)

(73) Assignee: Robert Bosch GmbH, Stuttgart (DE)

( * ) Notice: Under 35 U.S.C. 154(b), the term of this patent shall be extended for 0 days.

(21) Appl. No.: 09/254,068

(22) PCT Filed: May 9, 1998

(86) PCT No.: PCT/DE98/01291

§ 371 Date: Dec. 14, 1999

§ 102(e) Date: Dec. 14, 1999

(87) PCT Pub. No.: WO99/00887

PCT Pub. Date: Jan. 7, 1999

(30) Foreign Application Priority Data

Jun. 26, 1997 (DE) .............................................. 197 27 165

(51) Int. Cl.[7] .................................................. H02K 9/00
(52) U.S. Cl. ............................ 310/52; 310/64; 310/68 R; 165/80.3
(58) Field of Search ............................ 310/52, 64, 68 R, 310/89, 156; 165/80.3, 185

(56) References Cited

U.S. PATENT DOCUMENTS

| | | | |
|---|---|---|---|
| 3,539,848 | * 11/1970 | Dosch et al. ........................ | 310/68 R |
| 4,144,932 | * 3/1979 | Voigt .................................. | 165/80.3 |
| 5,006,744 | * 4/1991 | Archer et al. ........................ | 310/89 |
| 5,129,451 | * 7/1992 | Moir et al. .......................... | 165/185 |
| 5,659,217 | * 8/1997 | Petersen .............................. | 310/156 |
| 5,787,976 | * 8/1998 | Hamburgen et al. ................ | 165/185 |
| 5,818,133 | * 10/1998 | Kershaw et al. ................... | 310/67 R |

FOREIGN PATENT DOCUMENTS

| | | | |
|---|---|---|---|
| 41 22 529 A1 | * | 1/1993 | (DE) . |
| 295 12 597 U1 | * | 11/1995 | (DE) . |
| 0 210 090 A1 | * | 1/1987 | (EP) . |
| 0 439 016 A1 | * | 7/1991 | (EP) . |
| 0 501 198 A1 | * | 9/1992 | (EP) . |
| 1580841 | * | 9/1969 | (FR) . |
| 2 652 458 A3 | * | 3/1991 | (FR) . |

* cited by examiner

*Primary Examiner*—Nestor Ramirez
*Assistant Examiner*—Joseph Waks
(74) *Attorney, Agent, or Firm*—Ronald E. Greigg; Edwin E. Greigg

(57) ABSTRACT

An electric drive motor with a rotor in the form of an external rotor and with a stator, which has a base body comprised of heat conductive material. A bearing hub for the rotor and a support that extends radially away from the hub and is for containing a printed circuit board. The printed circuit board is equipped with electronics and is disposed on a side of the support oriented away from the rotor for the sake of an improved removal of the dissipated heat that is produced in the electronics, a multitude of concentric cooling ribs are embodied on the radial surface of the support oriented toward the rotor.

20 Claims, 2 Drawing Sheets

ELECTRIC DRIVE MOTOR

PRIOR ART

The invention relates to an electric drive motor.

In a known, electronically commutated electric drive motor of this kind (DE 41 22 529 A1), an annular wall is attached to and of one piece with the outer annular edge of the support and this wall encloses the cup-shaped rotor with a radial gap spacing and has axial cooling ribs on its outside oriented away from the rotor. Switching transistors that are present in the power electronics and are for the electronic commutation are disposed on the printed circuit board so that their cooling surfaces lie flat against the radial surface of the support and are pressed against it by means of leaf springs. The dissipated heat that is essentially produced by the power transistors travels by way of the flange-like support into the annular wall and is dissipated relatively well here into the surrounding air since the rotor turning inside the annular wall also provides for a rapid exchange of the air disposed there.

ADVANTAGES OF THE INVENTION

The drive motor according to the invention has the advantage that by means of the concentric cooling ribs, not only is the surface area of the base body that acts as a cooling surface increased, but also an ideal circulation around the cooling ribs is produced in particular by virtue of the air flow against them, which is produced by the rotor that is embodied in the form of an external rotor so that on the whole, the removal of dissipated heat from the electronics is accelerated and improved. The heat dissipation capacity can be still further increased successively if, in accordance with preferred embodiments of the invention, large openings are let into the support. The openings can also interrupt the concentric cooling rings, and the printed circuit board is covered by a covering cap fastened to the support and the cap bottom of this covering cap is provided with openings that continue on in hollow cylindrical pins that extend to the support and are aligned with the openings in the support. In addition, the rotor has air openings in its cup bottom disposed opposite from the radial surface of the support with axial spacing. As a result, a good air exchange is assured on the inside of the motor, which improves the air removal from the inside of the motor and thus increases the cooling capacity.

If, according to another embodiment of the invention, the hollow chamber between the covering cap and the radial surface of the support oriented toward it is lined with a favorably heat conducting molded mass, then additional energy paths are produced. The energy paths convey dissipation heat from the electronics by way of the molded mass on the one hand to the cap and on the other hand to the base body and from there, dissipate the heat to the surrounding air.

Another improvement of the heat dissipation can be achieved by way of an additional energy path which, as is the case with the known drive motor described at the beginning, leads from the electronics by way of the support to an encompassing cylinder that is attached to this support on the edge and is of one piece with it axially, which also has additional axial cooling ribs on the outside. The rotor turning inside the encompassing cylinder also provides for an intensive air exchange against the inner wall of the encompassing cylinder.

BRIEF DESCRIPTION OF THE DRAWINGS

The invention will be explained in more detail in conjunction with an exemplary embodiment shown in the drawings.

DESCRIPTION OF THE EXEMPLARY EMBODIMENT

Figure 1:
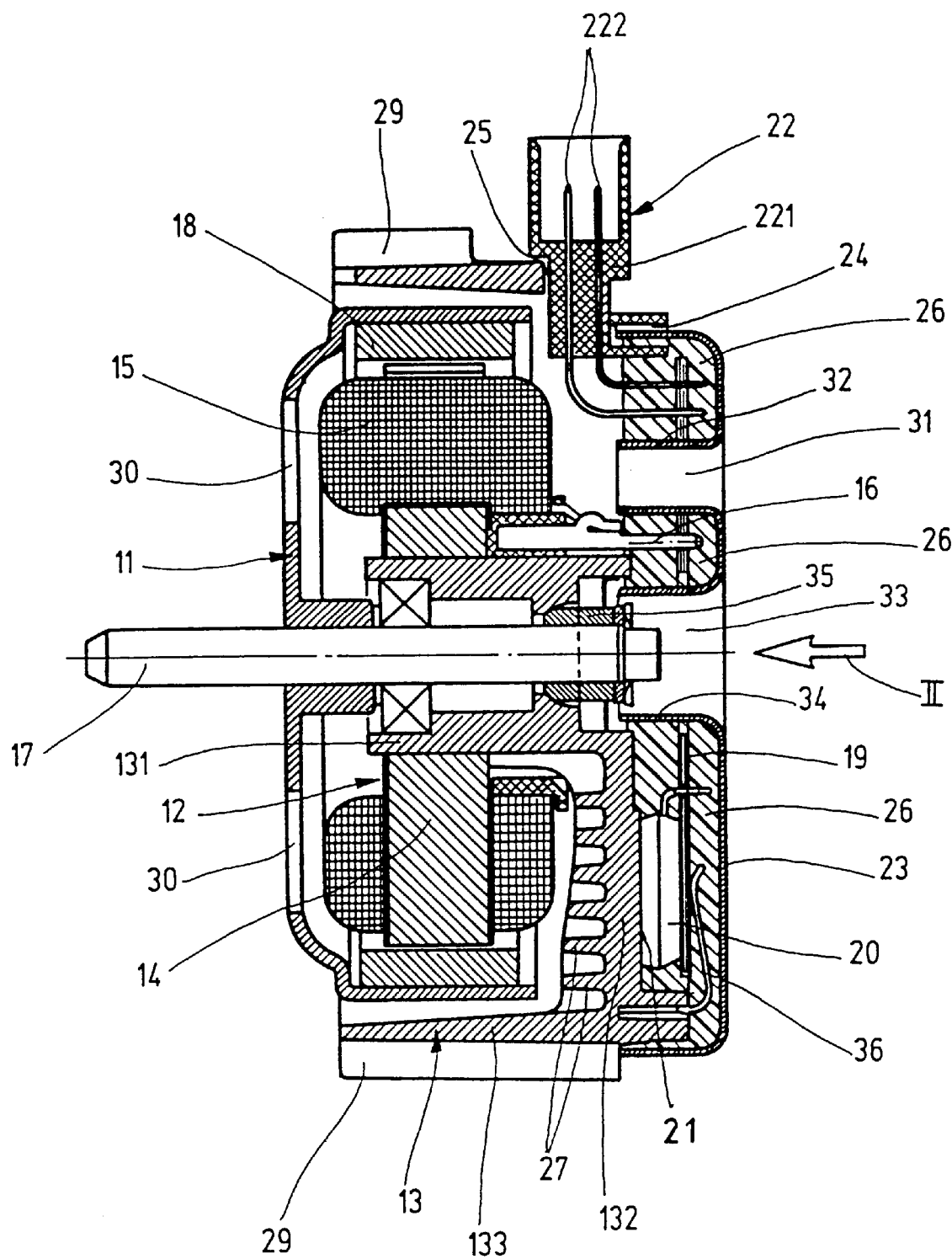
FIG. 1 is a longitudinal section through an electric drive motor.

In a known manner, the motor with electronic commutation that is depicted in FIG. 1 as an exemplary embodiment for an electric drive motor has a rotor 11, which is embodied here in the form of an external rotor, and a stator 12, which has a base body 13 comprised of favorably heat conductive material, e.g. aluminum or magnesium. A bearing hub 31, a flange-like support 132 that extends away from the hub, and an encompassing cylinder 133 attached axially to the outer circular edge of the support 132 are embodied as being of one piece inside the base body 13. On the outside of its bearing hub 131, the base body 13 supports a bundle of laminations 14, in which a stator or armature winding 15 is received. The power supply to the stator winding 15 is carried out by way of connection lugs 16.

The rotor 11, which is embodied as cup-shaped, is supported in a radially fixed manner on a rotor shaft 17, which is received so that it can rotate in the bearing hub 131 by means of two bearings and encompasses the stator winding 15 with its cylindrical cup part. The exciter poles are disposed in a known manner in the form of permanent magnet segments 18 on the inner wall of the cylindrical cup part.

The power electronics required for the electronic commutation are accommodated on a printed circuit board 19, which is disposed on the side of the support 132 of the base body 13 oriented away from the rotor 11. The electronics include a number of switching transistors 20 that are embodied as power transistors, which are disposed on the printed circuit board so that with their cooling surfaces 21, they lie flat against the radial surface of the support 132 oriented toward the printed circuit board 19. By means of spring brackets 36 that are embodied as leaf springs, which are fastened in the support 132 of the base body 13 and rest with frictional, non-positive adhesion against the back side of the printed circuit board 19 oriented away from the transistors 20, the printed circuit board 19 is attached to the support 132 so that the cooling surfaces 21 of the switching transistors 20 are pressed against the support 132. The connection lugs 16 for the stator winding 15 are likewise affixed to the printed circuit board 19. The power supply is provided for by an attachment plug 22 which is connected with its plug housing 221 to the base body 13 and is guided with its plug contacts 222 against the printed circuit board 19.

Figure 2:
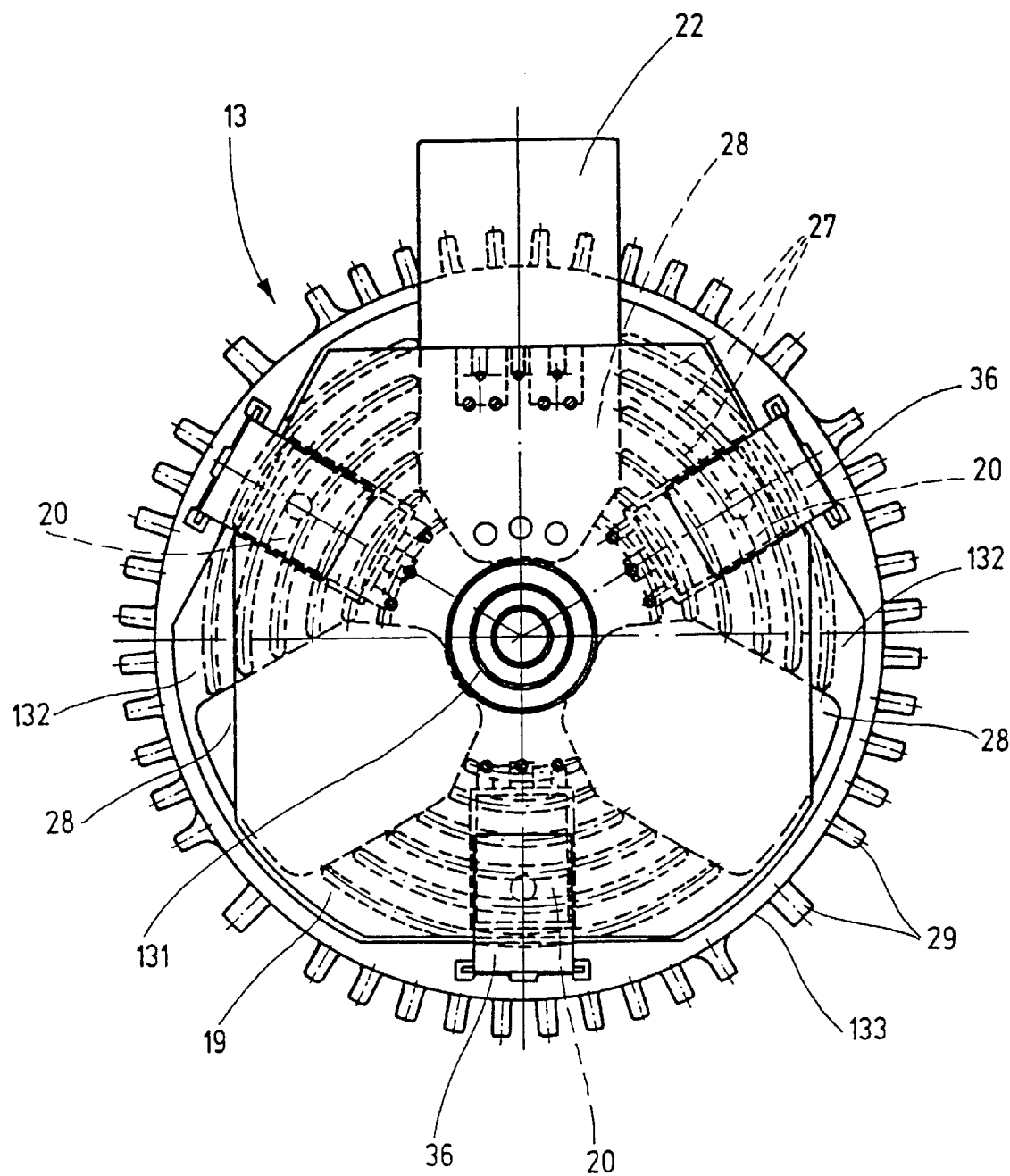
FIG. 2 is a view of a base body of the stator of the drive motor, with a mounted printed circuit board, in the direction of the arrow II in FIG. 1.

The printed circuit board 19 with the electronics is covered over by a covering cap 23 that is fastened to the support 132. The plug housing 221 thereby protrudes through a radial bore 25 into the encompassing cylinder 133 and is placed with a groove 24 onto the edge of the cylindrical part of the covering cap 23. The hollow chamber between the covering cap 23 and the support 132 is lined with a favorably heat conductive molded mass 26, wherein the printed circuit board 19 and the switching transistors 20, with the exception of the cooling surfaces 21 that are pressed against the support 132, are enclosed on all sides by the molded mass 26. A number of heat conduction paths are provided for a rapid and effective removal of the dissipation heat produced by the switching transistors 20. To this end, on the one hand, a multitude of concentric cooling ribs 27 are embodied on the radial surface of the support 132 oriented toward the rotor 11 and these concentric cooling ribs 27 are interrupted in their annular course by extensive openings 28 (FIG. 2) that are let into the support 132 (FIG. 2). The air flow produced by the rotor 11, which turns with a gap spacing in the encompassing cylinder 133, flows around these annular cooling ribs 27 in an ideal manner so that a large part of the dissipated heat of the switching transistors 20 is dissipated by way of the support 132 and the cooling ribs 27. Another energy path travels by way of the support 132 into the encompassing cylinder 133, which has axial ribs 29 on its outside oriented away from the rotor 11, which favorably dissipate the heat from the encompassing cylinder 133 to the environment. In addition, there is a third heat conducting path from the switching transistors 20 by way of the molded mass 26 to the covering cap 23, which in turn radiates the dissipated heat to the environment.

In order to improve the air exchange on the inside of the motor and in order thereby to more rapidly remove the air being heated against the cooling ribs 27 to the outside, on the one hand, air openings 30 are provided in the cup bottom of the cup-shaped rotor 11 and on the other hand, openings 31 are let into the cap bottom of the covering cap 23, which continue on in hollow pins 32 that are of one piece with the covering cap 23, which in turn extend to the openings 28 in the support 132 and are aligned with the openings 28. By means of the openings 31 and the openings 28 in the support 132, as well as the air openings 30 in the rotor 11, a very favorable air exchange is assured on the inside of the motor, so that on the whole, the favorably heat conductive base body 13 that is made of magnesium or aluminum can very rapidly give off the dissipated heat, which has been transmitted by all of the power transistors 20, to the continuously exchanged air.

An additional opening 33 is also provided in the center of the covering cap 23, which likewise continues on into a hollow pin, which extends to the bearing hub 131 or to the bearing of the rotor shaft 17, which bearing is embodied in the form of a dome bearing 35. The pin axis is then aligned with the axis of the rotor shaft 17. An extension of the drive motor to a second drive is possible by means of this additional opening 33 for the end of the rotor shaft 17.

The foregoing relates to preferred exemplary embodiments of the invention, it being understood that other variants and embodiments thereof are possible within the spirit and scope of the invention, the latter being defined by the appended claims.

What is claimed is:

1. An electric drive motor comprising a rotor (11) in the form of an external rotor, a stator (12), said stator has a base body (13) comprised of heat conductive material, a bearing hub (131) for the rotor (11) and a support (132) that extends radially away from said hub and is for supporting a printed circuit board (19), said printed circuit board is equipped with electronics and is disposed on a side of the support (132) oriented away from the rotor (11) in an axial direction, a multitude of concentric cooling ribs (27) are embodied on the radial surface of the support (132) oriented toward the rotor (11) in an axial direction, the printed circuit board (19) is covered over by a covering cap (23), said covering cap is fastened to the support (132), and a hollow space remaining between the covering cap (23) and the support (132) is lined with a favorably heat conductive molded material (26); and openings (31) are provided in a bottom of the covering cap (23), which continue on in hollow pins (32) that extend to the support (132) and are aligned with openings (28) in the support (132).

2. The motor according to claim 1, in which openings (28) are let into the support (132) and extend over the concentric cooling ribs (27) and divide the cooling ribs into separate arc sections.

3. The motor according to claim 2, in which the printed circuit board (19) is covered over by a covering cap (23), said covering cap is fastened to the support (132), and a hollow space remaining between the covering cap (23) and the support (132) is lined with a favorably heat conductive molded material (26).

4. The motor according to claim 2, in which the rotor (11) is embodied as cupshaped and has air openings (30) in a cup bottom disposed opposite and spaced axially apart from the radial surface of the support (132).

5. The motor according to claim 2, in which the base body (13) has an encompassing cylinder (133), which is placed axially encompasses the rotor (11) with a radial gap spacing, and that axial ribs (29) which protrude from the encompassing cylinder (133) are provided on an outside oriented away from the rotor (11).

6. The motor according to claim 2, in which the base body (13), which is embodied as being of one piece with the bearing hub (131), is made of aluminum or magnesium.

7. The motor according to claim 1, in which the rotor (11) is embodied as cupshaped and has air openings (30) in a bottom of the cupshaped rotor disposed opposite and spaced axially apart from the radial surface of the support (132).

8. The motor according to claim 1, in which the base body (13) has an encompassing cylinder (133), which is placed axially encompasses the rotor (11) with a radial gap spacing, and that axial ribs (29) which protrude from the encompassing cylinder (133) are provided on an outside oriented away from the rotor (11).

9. The motor according to claim 1, in which the base body (13), which is embodied as being of one piece with the bearing hub (131), is made of aluminum or magnesium.

10. The motor according to claim 1, in which the rotor (11) is embodied as cupshaped and has air openings (30) in a bottom disposed opposite of the cupshaped rotor and spaced axially apart from the radial surface of the support (132).

11. The motor according to claim 1, in which the rotor (11) is embodied as cupshaped and has air openings (30) in a cup bottom disposed opposite and spaced axially apart from the radial surface of the support (132).

12. The motor according to claim 1, in which the base body (13) has an encompassing cylinder (133), which is placed axially encompasses the rotor (11) with a radial gap spacing, and that axial ribs (29) which protrude from the encompassing cylinder (133) are provided on an outside oriented away from the rotor (11).

13. An electric drive motor comprising a rotor (11) in the form of an external rotor, a stator (12), said stator has a base body (13) comprised of heat conductive material, a bearing hub (131) for the rotor (11) and a support (132) that extends radially away from said hub and is for supporting a printed circuit board (19), said printed circuit board is equipped with electronics and is disposed on a side of the support (132) oriented away from the rotor (11) in an axial direction, a multitude of concentric cooling ribs (27) are embodied on a radial surface of the support (132) and oriented toward the rotor (11) in the axial direction, and the electronics include switching transistors (20) with cooling surfaces (21) that are secured to the printed circuit board (19) so that the cooling surface (21) lies flat against the radial surface of the support (132) oriented toward the printed circuit board (19).

14. The motor according to claim 13, in which the printed circuit board (19) is covered over by a covering cap (23), said covering cap is fastened to the support (132), and a hollow space remaining between the covering cap (23) and the support (132) is lined with a favorably heat conductive molded material (26).

15. The motor according to claim 14, in which openings (31) are provided in the cap bottom of the covering cap (23), which continue on in hollow pins (32) that extend to the support (132) and are aligned with the openings (28) in the support (132).

16. The motor according to claim 13, in which the cooling surfaces (21) are pressed against the radial surface by means of spring brackets (36) and that the spring brackets (36) are fastened in the support (132) and pressed against a side of the printed circuit board (19) oriented away from the switching transistors (20).

17. An electric drive motor comprising a rotor (11) in the form of an external rotor, a stator (12), said stator has a base body (13) comprised of heat conductive material, a bearing hub (131) for the rotor (11) and a support (132) that extends radially away from said hub and is for supporting a printed circuit board (19), said printed circuit board is equipped with electronics and is disposed on a side of the support (132) oriented away from the rotor (11) in an axial direction, a multitude of concentric cooling ribs (27) are embodied on a radial surface of the support (132) and oriented toward the rotor (11) in an axial direction, openings (28) are let into the support (132) and extend over the concentric cooling ribs (27) and divide the cooling ribs into separate arc sections, and the electronics include switching transistors (20) with cooling surfaces (21) that are secured to the printed circuit board (19) so that the cooling surface (21) lies flat against the radial surface of the support (132) oriented toward the printed circuit board (19).

18. An electric drive motor comprising a rotor (11) in the form of an external rotor, a stator (12), said stator has a base body (13) comprised of heat conductive material, a bearing hub (131) for the rotor (11) and a support (132) that extends radially away from said hub and is for supporting a printed circuit board (19), said printed circuit board is equipped with electronics and is disposed on a side of the support (132) oriented away from the rotor (11) in an axial direction, a multitude of concentric cooling ribs (27) are embodied on a radial surface of the support (132) and oriented toward the rotor (11) in the axial direction, the printed circuit board (19) is covered over by a covering cap (23), said covering cap is fastened to the support (132), and a hollow space remaining between the covering cap (23) and the support (132) is lined with a favorably heat conductive molded material (26), and eth electronics include switching transistors (20) with cooling surfaces (21) that are secured to the printed circuit board (19) so that the cooling surface (21) lies flat against the radial surface of the support (132) oriented toward the printed circuit board (19).

19. An electric motor comprising a rotor (11) in the form of an external rotor, a stator (12), said stator has a base body (13) comprised of heat conductive material, a bearing hub (131) for the rotor (11) and a support (132) that extends radially away from said hub and is for supporting a printing circuit board (19), said printed circuit board is equipped with electronics and is disposed on a side of the support (132) oriented away from the rotor (11) in an axial direction, a multitude of concentric cooling ribs (27) are embodied on a radial surface of the support (132) and oriented toward the rotor (11) in the axial direction, openings (28) are let into the support (132) and extend over the concentric cooling ribs (27) and divide the cooling ribs into separate arc sections, and the cooling surfaces (21) are pressed against the radial surface by means of spring brackets (36) and that the spring brackets (36) are fastened in the support (132) and pressed against a side of the printed circuit board (19) oriented away from the switching transistors (20).

20. An electric drive motor comprising a rotor (11) in the form of an external rotor, a stator has a base body (13) comprised of hear conductive material, a bearing hub (131) for the rotor (11) and a support (132) that extends radially away from said hub and is for supporting a printed circuit board (19), said printed circuit board is equipped with electronics and is disposed on a side of the support (132) oriented away from the rotor (11) in an axial direction, a multitude of concentric cooling ribs (27) are embodied on a radial surface of the support (132) and oriented toward the rotor (11) in the axial direction, the printed circuit board (19) is covered over by a covering cap (23), said covering cap is fastened to the support (132), and a hollow space remaining between the covering cap (23) and the support (132) is lined with a favorably heat conductive molded material (26), and the cooling surfaces (21) are pressed against the radial surface by means of spring brackets (36) and that the spring brackets (36) are fastened in the support (132) and pressed against a side of the printed circuit board (19) oriented away from the switching transistors (20).

* * * * *